United States Patent [19]
Tan

[11] 3,969,763
[45] July 13, 1976

[54] COLOR TELEVISION CAMERA PROVIDED WITH A PICK-UP DEVICE AND A COLOR FILTER PLACED IN FRONT THEREOF

[75] Inventor: Sing Liong Tan, Eindhoven, Netherlands

[73] Assignee: U.S. Philips Corporation, New York, N.Y.

[22] Filed: Dec. 18, 1973

[21] Appl. No.: 425,940

[30] Foreign Application Priority Data
Jan. 24, 1973 Netherlands.................... 7300970

[52] U.S. Cl.................................. 358/42; 358/44
[51] Int. Cl.².................................. H04N 9/22
[58] Field of Search............... 358/42, 43, 44, 11; 250/208

[56] References Cited
UNITED STATES PATENTS

| | | | |
|---|---|---|---|
| 2,916,624 | 12/1959 | Angel et al. | 250/208 |
| 2,938,074 | 5/1960 | Trott | 358/42 |
| 3,604,839 | 9/1971 | Kitsopoulos | 358/42 |
| 3,689,690 | 9/1972 | Tan | 358/42 |

*Primary Examiner*—George H. Libman
*Attorney, Agent, or Firm*—Frank R. Trifari; Henry I. Steckler

[57] ABSTRACT

A field-sequential color television camera provided with a pick-up device formed with a number of read strips to be read simultaneously along and in front of which filter strips of a color filter move. An output of the pick-up device supplying output signals associated with successively different colors of the filter strips and with a given read strips is associated with each read strip. The outputs of the pick-up device are connected to a sequential-simultaneous converter so that picture signals each associated with a different color but with an instantaneously identical read strip of the number of read strips occur at camera outputs through a switching circuit and delay circuit. Movement in a scene does not exhibit any disturbing discolored edges upon display such as a so-called "color break". A simple converter construction is possible.

11 Claims, 5 Drawing Figures

COLOR TELEVISION CAMERA PROVIDED WITH A PICK-UP DEVICE AND A COLOR FILTER PLACED IN FRONT THEREOF

The invention relates to a colour television camera provided with a pick-up device and a colour filter placed in front thereof, suitable for separating light into different colours from a scene to be picked up, to which end the colour filter is constituted by filter strips having different light pass characteristics, said filter strips being movable along and in front of the pick-up device, said pick-up device converting the light with the different colours into associated sequentially occurring output signals which after reading the pick-up device apply simultaneous output signals to outputs of the camera through a sequential-simultaneous converter including a switching circuit and delay circuits.

Such a colour television camera is described in the "Television Engineering Handbook", by D. G. Fink on pages 17 – 98 to 17 – 102 of the 1957 edition. The colour filter is formed as a rotatable circular disc in which the filter strips are formed as sectors and are provided in groups of three strips having different light pass characteristics. In the pick-up device formed as a pick-up tube line-by-line and field-by-field reading is effected at a line and a field frequency which is three times the frequency as laid down for a television standard. The single output of the pick-up device conveying field-sequentially generated output signals is connected to the switching circuit in the sequential-simultaneous converter. Three delay circuits each being formed with a display tube and a camera tube optically coupled thereto follow the switching circuits. The switching circuit connects the output of the pick-up device alternately for one third of a field period to the display tube in a delay circuit. Due to the persistance of a displayed image on the display tube in the delay circuit, this image remains present during the remaining two thirds of the field period. In the three pick-up tubes in the delay circuits line and field reading is effected simultaneously and in accordance with the television standard so that the camera tubes apply simultaneous output signals in accordance with the standard to three outputs of the camera.

In the sequential-simultaneous converter described the higher speed of the line and field reading used for the pick-up device is converted into the three times slower speed associated with the standard. Field reading in the pick-up device is effected synchronously with the rotation of a colour filter strip during one third of a standard field period so that the groups of three colour filter strips have a repetition period of one standard field period. The advantage thereof is that visibly discoloured edges in the relevant parts become manifest upon display in a less disturbing manner in case of moving parts in a scene to be picked-up. When the repetition period of the group of colour filter strips is longer, for example, three field periods, the moving part between two consecutive field readings of one of the same colour is displaced to such an extent that the displacement displayed in a discoloured manner is clearly visible upon display, the so-called colour break.

For obtaining the advantage upon display of the undisturbing visibly discoloured edges upon movement in the scene the described camera is provided with the complicated converter giving the described speed conversion. Due to the camera construction with four pick-up tubes and three display tubes there is no economy in price of a camera based on sequential signal generation as compared with a camera based on simultaneous signal generation. Further, stringent requirements must be imposed on the delay circuits in connection with the signal storage and signal reading which must be suitable for the maximum video signal bandwidth. Both the display tubes and the camera tubes in the delay circuits will then introduce superimposition errors into the simultaneous signals.

It is an object of the invention to provide a colour television camera based on sequential signal generation in which inter alia the described advantage is achieved while in addition the sequential-simultaneous converter can be formed in a simple and cheap manner. To this end the camera according to the invention is characterized in that the pick-up device is provided with read means for performing a number of simultaneously occurring readings of read strips present at the pick-up device each corresponding to an instantaneously local presence of one of the filter strips of the colour filter so that the pick-up device formed with outputs each being coupled to a read strip conveys output signals at each output associated with successively different colours corresponding to the relevant filter strips and with one region determined by the relevant read strip, the outputs of the pick-up device being connected to the sequential-simultaneous converter so that the camera outputs connected to the converter each convey a picture signal which is associated through the switching circuit and the delay circuits with a different colour of light but with an instantaneously identical read strips of the number of read strips.

The invention is based on the recognition of the fact that for preventing the disturbingly visibly discoloured edges upon display of moving parts in a scene it is not necessary to increase the read speed in the pick-up device and to use a complicated converter for the described speed conversion, but that it is possible when using the read speed in the pick-up device laid down for television, to form the pick-up device with a plurality of read strips which are simultaneously read. As is desired the repetition period of the groups of colour filter strips moving along and in front of the pick-up device is then equal to the standard field period.

The invention will be described in greater detail with reference to the following Figures as examples in which FIG. 1 diagrammatically shows an embodiment of a colour television camera according to the invention.

Figure 1:
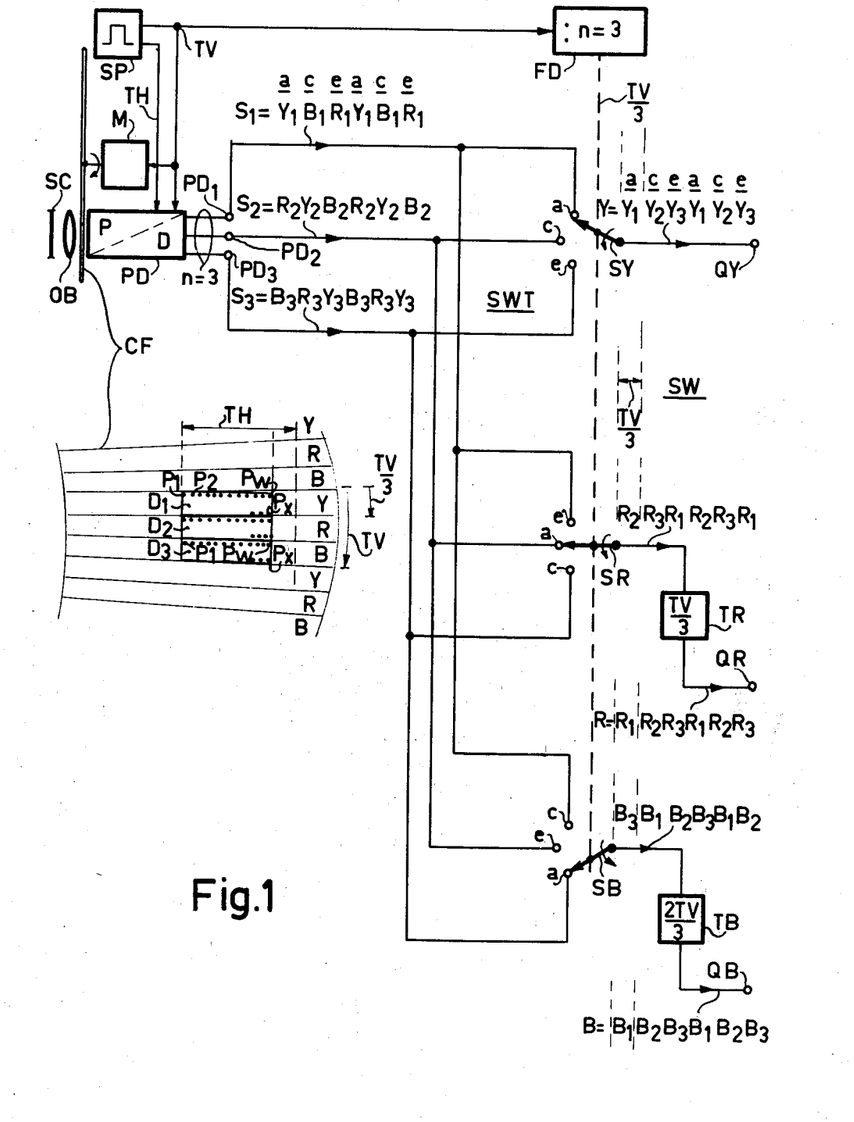

The colour television camera according to the invention shown in FIG. 1 serves for picking up a scene SC. Light coming from the scene SC is projected by an objective lens OB present in the camera through a colour filter CF onto a pick-up device PD. The colour filter CF is formed as a circular disc which is rotated along and in front of the pick-up device PD by a motor M. In FIG. 1 the section of the disc of the colour filter CF which is present in front of the pick-up device PD is shown in an elevational view as seen from the objective lens OB. The colour filter CF is formed with filter strips in the shape of sectors which are denoted in groups by Y, R and B. The filter strips of the colour filter CF had different light pass characteristics, the filter strips Y passing the light coming from the scene SC uninfluenced and the strips R and B only passing red and blue coloured light, respectively. The colour filter CF thus separates the scene light into different colours namely into uninfluenced light having the original colours present in the scene SC and into red and blue coloured light.

According to the position of the colour filter CF shown in FIG. 1 a group of three filter strips Y, R and B is present in front of the pick-up device PD which is formed with three read strips $D_1$, $D_2$ and $D_3$ corresponding thereto. The assembly of read strips $D_1$, $D_2$ and $D_3$ constitutes a pick-up surface of the pick-up device PD in which the pick-up areas in the separate read strips $D_1$, $D_2$ and $D_3$ are denoted by $P_1$, $P_2$ ... $P_x$. The motor M rotates the colour filter CF at such a speed that a group of filter strips B, R and Y rotates along and in front of the pick-up device PD in one time duration TV. A time duration of TV/3 is necessary per filter strip so as to be displaced over one filter strip width. The time duration TV is the field period occurring in television which as a function of the chosen television standard is for example 1/50 or 1/60 s. For synchronisation of the rotation of colour filter CF a synchronising signal having the repetition period TV and originating from a synchronising signal generator SP is applied to the motor M. The generator SP not only provides the field synchronising signal with the field period TV but also a line synchronising signal with a line period TH which signals are applied for the purpose of synchronisation to the pick-up device PD. The (periodically occurring) line period TH in which the series of pick-up areas $P_1$ ... $P_w$ are read is plotted in FIG. 1 near the colour filter CF. The generator SP may be formed in a manner not shown with an input for external synchronisation.

The pick-up device PD may be formed in different manners. One embodiment is possible with a pick-up panel P having a plurality of series of photosensitive pick-up areas $P_1$, $P_2$ ... $P_w$ in a semiconductor body which series together constitute a read strip $D_1$, $D_2$ or $D_3$. At the pick-up areas $P_1$ ... $P_x$ of the pick-up panel P photons of the incident light generate hole electron pairs which cause a voltage variation across a photosensitive semiconductor junction biassed in the reverse direction. After some time, a so-called light integration time, a pick-up area is read whereafter a subsequent light integration starts. When forming the three separate read strips $D_1$, $D_2$ and $D_3$ the pick-up panel P may be formed with three groups of cross-bar systems in which the pick-up areas $P_1$, $P_2$ ... $P_x$ are present between intersecting cross-bars and are constituted by photosensitive transistors or diodes in the semiconductor body. For reading the pick-up areas $P_1$ ... $P_x$ in a read strip $D_1$, $D_2$ or $D_3$ the pick-up device PD is provided with read means D in case of using a cross-bar system apply pulses to each cross-bar of the two groups of cross-bars so that upon coincidence of the pulses at one pick-up area the information given at that area by photons of incident light is read to an output $PD_1$, $PD_2$ or $PD_3$ of the pickup device PD connected to the read strip $D_1$, $D_2$ or $D_3$. Instead of cross-bar reading it is alternatively possible to move the photo information through a series of pick-up areas $P_1$ ... $P_w$ with the aid of a clock-pulse source incorporated in the read means D. The pick-up areas $P_1$ ... $P_x$ are, for example, diode junctions biassed in the reverse direction to a substrate in the semiconductor body, while movement in the series is effected between capacitors occurring in the semiconductor body and present at the pick-up areas $P_1$ ... $P_x$. Alternatively other embodiments with charge coupling in the semiconductor bodies are possible.

The detailed embodiment of the pick-up panel P and the read means D of the pick-up device PD is of less importance in this case. It is relevant that one of the outputs $PD_1$, $PD_2$ and $PD_3$ is associated with each read strip $D_1$, $D_2$ and $D_3$. The same applies to an embodiment of the pick-up device PD with a pick-up tube. In a pick-up embodiment a pick-up plate P is present on which a potential image corresponding to the scene SC is formed through a photosensitive conversion. In case of a vidicon embodiment the photosensitive conversion is effected in a semiconductor layer biassed in the reverse direction onto which layer the scene light is projected through an electrically conducting transparent signal plate while the bare surface of the semiconductor layer for reading the information is scanned line by line and field by field by an electron beam as a read means. The pick-up plate P consists of the signal plate and the semiconductor layer. Pick-up tubes formed with discrete photodiodes in the semiconductor layer or based on secondary photoemission are alternatively possible. It is relevant that the pick-up plate P is formed with three separate read strips $D_1$, $D_2$ and $D_3$ which are each coupled to one of the outputs $PD_1$, $PD_2$ and $PD_3$ while at least three electron beams are generated by the read means D which simultaneously scan the read strips $D_1$, $D_2$ and $D_3$ under the influence of deflection means present in the means D. The three electron beams may be generated by one electron gun having three apertures or by three separate guns in the read means D. When using a pick-up tube provided with a pick-up plate P formed with the signal plate and the semiconductor layer it is sufficient to split up the signal plate into three separate strips. It is not necessary to split up the semiconductor layer but this might be done so as to reduce transverse leakage in the pick-up plate P. Furthermore, the three electron beams must be able to scan their own read strip $D_1$, $D_2$ or $D_3$ repeatedly in lines and fields and must all three be able to successively scan the read strips $D_1$, $D_2$ and $D_3$, each being instantaneously present on a different read strip.

Starting from a number $n$ of read strips $D_1, D_2 ... D_n$ with $n = 3$ according to FIG. 1 three output signals $S_1$, $S_2$ and $S_3$ are shown at the corresponding outputs $PD_1$, $PD_2$ and $PD_3$. The signal $S_1$ is denoted by $S_1 = Y_1B_1R_1Y_1B_1R_1$. This signal can be derived in the embodiment shown from the colour filter CF when for example the pick-up area $P_1$ in the read strip $D_1$ is considered. Assuming that in the position of the colour filter CF shown the pick-up area $P_1$ in the pick-up device PD is read, there follows that a signal Y occurs at the output $PD_1$ because the filter strip Y was in front of the pick-up area $P_1$ ($D_1$) during the line integration time TV/3 prior to reading. The index 1 in the signal $Y_1$ denotes that it is associated with the first read strip $D_1$. After reading the pick-up area $P_1$ ($D_1$) the filter strip B occurs at that area. While the pick-up areas $P_2$ to $P_x$ of the read strip $D_1$ are read during the time duration TV/3, which yields the signal $Y_1$, the filter strip B is further rotated along and in front of the read strip $D_1$. After reading the pick-up area $P_x$ ($D_1$) the pick-up area $P_1$ ($D_1$) is read again. The information at the pick-up area $P_1$ ($D_1$) is then determined by the filter strip B so that a signal $B_1$ occurs at the output $PD_1$. Subsequently the filter strip R is gradually moved before the read strip $D_1$. After a subsequent light integration time of TV/3 the pick-up area $P_1$ ($D_1$) produces a signal $R_1$. The filter strip Y starts to move before the read strip $D_1$ which produces the signal $Y_1$ after a time TV/3.

Simultaneously with reading the read strip $D_1$ the read strips $D_2$ and $D_3$ are read. As a result the first signal to appear at the output $PD_2$ in the position shown in FIG. 1 of the colour filter CF is a signal $R_2$ whereafter signals $Y_2$, $B_2$, $R_2$ etc. follow as is shown for the output signal $S_2$ in FIG. 1. The sequence B, R, Y of the filter strips present before the read strip $D_3$ produces the output signal $S_3 = B_3R_3Y_3B_3R_3Y_3$ etc. at the output $PD_3$.

The different signals Y, B and R which occur in the output signals $S_1$, $S_2$ and $S_3$ of the pick-up device PD during the periods TV/3 correspond to the uninfluenced light, blue light or read light coming from the scene SC which is split through th colour filter CF. The successive signals in the signals $S_1$, $S_2$ and $S_3$ are associated with different colours of light but with one and the same local determination given by the relevant read strip which is denoted by the indices 1, 2 and 3 at the signals, S, Y, B and R. For display on display apparatus formed in accordance with standards laid down for colour television the signals $S_1$, $S_2$ and $S_3$ are unsuitable. For performing a signal conversion of the signals $S_1$, $S_2$ and $S_3$ into signals laid down in accordance with the television standard the camera according to FIG. 1 is provided with a sequential-simultaneous converter SWT in which a switching circuit SW and two delay circuits TR and TB are incorporated.

The switching circuit SW is formed with some change-over switches SY, SR and SB. The number of change-over switches (SW) must be at least equal to the number of $n = 3$ read strips $D_1$, $D_2$ and $D_3$. Each change-over switch (SW) must also have $n = 3$ selection contacts denoted by $a$, $c$ and $e$ in FIG. 1. Each change-over switch (SW) is formed with a master contact having a switching arm. The master contact of the change-over switch SY is connected to an output QY of the camera according to FIG. 1. The master contact of the change-over switch SR is connected through the delay circuit TR to an output QR while the change-over switch SB is connected to an output QB through the delay circuit TB.

The change-over switches (SW) are shown as mechanical switches for the sake of simplicity, but will in practice be formed electronically. For synchronously changing-over the switches SY, SR and SB FIG. 1 shows a switching signal generator FD. The generator FD is connected for the purpose of synchronisation to the output of the generator SP which produces the synchronising signal with the repetition period TV. The generator FD is formed as a frequency divider having a division number of $n = 3$ so that the change-over switches (SW) receive a switching signal with a repetition period of TV/3. During a period of approximately TV/3 the switching arms of the change-over switches (SW) are at one of the contacts $a$, $c$, or $e$. It is shown in the delay circuit TR that it has a delay time of TV/3 while that of the circuit TB is equal to 2TV/3.

The selection contacts $a$, $c$ and $e$ of the change-over switches SY, SR and SB are connected in a specific manner to the outputs $PD_1$, $PD_2$ and $PD_3$ of the pick-up device PD. The connotation of the selection contacts of FIG. 1 is given in such a manner that the three switching arms are simultaneously at the selection contact $a$, $c$ or $e$. With this as a starting point there follows for the connections that the output $PD_1$ of the pick-up device is connected to the selection contacts $a$ SY, $c$ SB and $e$ SR, the output $PD_2$ is connected to the selection contacts $a$ SR, $c$ SY and $e$ SB, and the output $PD_3$ is connected to the selection contacts $a$ SB, $c$ SR and $e$ SY.

To explain the operation of the sequential-simultaneous converter SWT the switching arm positions on the selection contacts of the change-over switches (SW) are denoted by $a\ c\ e\ a\ c\ e$ for the signals $S_1 = Y_1B_1R_1Y_1B_1R_1$ of FIG. 1. The positions are likewise associated with the signals $S_2$ and $S_3$ of FIG. 1. For change-over switch SY there follows that in the position $a$ the signal $Y_1$ from the output $PD_1$ of the pick-up device is passed, in the position $c$ the signal $Y_2$ from the output $PD_2$ is passed and in the position $e$ the signal $Y_3$ from the output $PD_3$ is passed, etc. in subsequent cycles. After the change-over switch SY a picture signal $Y = Y_1Y_2Y_3Y_1Y_2Y_3$ occurs at the camera output QY. Derived in the same manner and starting from the signal $R_2$ in the position $a$ the signal $R_2R_3R_1R_2R_3R_1$ occurs after the change-over switch SR. The delay circuit TR with the delay time TV/3 follows the change-over switch ST so that a (delayed) picture signal $R = R_1R_2R_3R_1R_2R_3$ occurs at the camera output QR. After the change-over switch SB the signal $B_3B_1B_2B_3B_1B_2$ occurs as from the signal $B_3$ in the position $a$. The delay circuit TB with the delay time 2TV/3 causes the picture signal $B = B_1B_2\ B_3B_1B_2B_3$ to occur at the camera output QB (which signal is twice delayed by the time TV/3).

The result is that the camera outputs QY, QR and QB convey picture signals Y, R and B each associated with different colours but denoted by the same index 1,2 or 3 at the signals Y, R and B which occur simultaneously and instantaneously have one and the same local determination. The simultaneous picture signals Y, R and B occurring at the outputs QY, QR and QB are suitable for the normally usable signal processes. In this case Y is the so-called luminance signal and R and B are red and blue colour signals. A picture signal G can be derived through the relation $Y = R + B + G$ applying for television which signal occurs as a green colour signal in ths signal processing.

The line and field blanking periods common in television have not been taken into account hereinbefore. For the line blanking periods there applies that after reading the last pick-up area $P_W$ in each series of pick-up areas $P_1 \ldots P_W$ constituting a television line, the first pick-up area $P_1$ of the next series is read after the normally applying line blanking period. For the purpose of illustration the line period TH is shown at the colour filter CF of FIG. 1. which period comprises the line scan period with the picture information and the line blanking period without information. The line blanking period is approximately 18% of the line period TH. After reading the last pick-up area $P_X$ in each read strip $D_1$, $D_2$ and $D_3$ the first pick-up area $P_1$ in the first series of pick-up areas $P_1 \ldots P_W$ can be read after the next line blanking period. The switches (SW) are changed over during the latter line blanking period which occurs between two readings of read strips $D_1$, $D_2$ and $D_3$. There follows that the picture signals Y, R and B having the conventional line blanking periods occur at the outputs Q of the camera. The field blanking periods may be introduced into the picture signals Y, R and B by connecting the outputs QY, QR and QB to signal blanking circuits not shown which are active at the end of the signals $Y_3$, $R_3$ and $B_3$ and/or at the beginning of the signals $Y_1$, $R_1$ and $B_1$ during the field blanking period laid down in the standard of twenty line periods TH.

The colour television camera according to the invention shown in FIG. 1 has the following three advantages:

1. The sequential-simultaneous converter SWT can be formed in a simple manner while the repetition period (TV) of the groups of filter strips Y, R and B is so high that in case of moving parts in the scene SC disturbingly visible discoloured edges do not occur upon display. The converter SWT only includes two delay circuits TR and TB having a relatively short delay time which is equal to one third and two thirds of a field period according to the standard.

2. The luminance signal Y is obtained without being conveyed by a delay circuit while colour signals having a limited bandwidth can be applied to the two delay circuits TR and TB to be used. As a result two cheap delay circuits having a limited bandwidth up to for example 0.5 MHz may be used while the luminance signal Y with a bandwidth up to 5 MHz is provided by the camera according to FIG. 1. For a pick-up panel embodiment of the pick-up device PD the delay circuits TR and TB may also be incorporated in the semiconductor body constituting the panel.

3. The colour signals R and B are always obtained after they have been conveyed by one given, own delay circuit TR or TB. An irregularity occurring in the given delay circuit TR or TB then always occurs in the same signal and is less noticeable upon display of the three simultaneous picture signals than when the irregularity would alternately occur in all three picture signals or the two colour signals.

It has been laid down in the television standards that a television image is constituted by two interlaced line fields. For the said 2-in-1 interlacing a raster period comprises two field periods TV each covering 1/50 or 1/60s and comprising 50% of an odd number of television lines given in the standard. Between two successive field periods this corresponds to a shift or half a line period between for example the instants of commencement of the line periods in one and in the other line field. By making a time shift between the readings of the read strips $D_1$, $D_2$ and $D_3$ together having a plurality of series of pick-up areas $P_1 \ldots P_W$ which is approximately equal to half the prescribed number of lines in the picture, a pseudo-line interlacing may be obtained in a manner to be illustrated with reference to the following Table 1 in the camera construction according to FIG. 1 without extra steps for the converter SWT being necessary.

Table 1.

| cycles change-over switch positions | | | | | | | | | | | |
|---|---|---|---|---|---|---|---|---|---|---|---|
| 1 | | | 2 | | | 3 | | | 4 | | |
| a | c | e | a | c | e | a | c | e | a | c | e |
| $\underline{Y_1}$ | $B_1$ | $R_1$ | $Y_1$ | $B_1$ | $R_1$ | $Y_1$ | $B_1$ | $R_1$ | $Y_1$ | $B_1$ | $R_1$ |
| $\underline{Y_2}$ | $Y_2$ | $B_2$ | $R_2$ | $Y_2$ | $B_2$ | $R_2$ | $Y_2$ | $B_2$ | $R_2$ | $Y_2$ | $B_2$ |
| $\underline{Y_3}$ | $R_3$ | $Y_3$ | $B_3$ | $R_3$ | $Y_3$ | $B_3$ | $R_3$ | $Y_3$ | $B_3$ | $R_3$ | $Y_3$ |

The signals Y, R and B are associated with a line reading of the read strips $D_1$, $D_2$ and $D_3$ in the pick-up device PD in which the instants of commencement of the line periods are shifted half a line period relative to the instants of commencement of line readings of the read strips $D_1$, $D_2$ and $D_3$ when the signals Y, R and B are supplied. Table 1 states four cycles of the change-over switch positions $a$, $c$ and $e$. Starting from a given (the underlined) line reading for the signals $Y_1$, $Y_2$ and $Y_3$ in the cycle 1, there follows for the cycles 2 and 4 a line reading ( . . . ) shifted over half a line period and the same line reading (—) as in the cycle 1 takes place in the cycle 3. Because the signals R are delayed by means of the delay circuit TR over the period TV/3 occurring between two change-overs, the same line reading is to occur at the previously read signal R in case of a given line reading of the signal Y. Thus, associated with the line reading with the signal $Y_1$ in the position $a$ of the cycles 2 and 4 is the same line reading at the signal $R_1$ in the position $e$ of the previous cycles 1 and 3. The same applies for the signals B delayed twice a period TV/3 so that in the position $c$ of the cycles 1 and 3 the signal $B_1$ is generated. The other line readings given in Table 1 follow in a similar manner.

The table shows that the line readings in the cycles 1 and 2 are repeated in the cycles 3 and 4 etc. The three simultaneous line readings in the position $a$ of the cycle 1 are identical. For the position $c$ there follows that the same line reading is effected in the second and third read strips $D_1$, $D_2$ with the signals $\underline{Y_2}$ and $\underline{R_3}$ but the line reading in the first read strip $D_1$ with the signal $B_1$ is shifted over half a line period. While in the position $e$ of the cycle 1 in the third read strip $D_3$ the former reading yields the signal $\underline{Y_3}$ the line reading is shifted over half a line period not only in the first read strip $D_1$ but also in the second read strip $D_2$ so that the signals $R_1$ and $B_2$ are obtained. In the position $a$ of the cycle 2 all three line readings are shifted over half a line period which yields the signals $Y_1$, $R_2$ and $B_3$. Subsequently the non-shifted line reading with the signal $\underline{B_1}$ starts in the first read strip $D_1$ at the position $c$ of the cycle 2, which reading is continued in the position $e$ of the cycle 2 and in the position $a$ of the cycle 3 at the read strips $D_2$ and $D_3$ so that the signals $\underline{B_2}$ and $\underline{B_3}$, respectively, are generated.

The transition between the two types of line reading is also effected for each of the signals Y, B and R in their field blanking periods. The types of line reading for the signal Y change between the position $e$ of a cycle (signal $Y_3$) and position $a$ of the next cycle (signal $Y_1$). For the signal B the type transition occurs between the positions $a$ and $c$ of one and the same cycle (signals $B_3$ and $B_1$). The signal R has the type transition between the positions $c$ and $e$ of the same cycle (signals $R_3$ and $R_1$). Since the transition between the two types of line reading is effected during the field blanking period it has no influence on the signal intended for display. A pseudo-interlaced picture signal is generated in the manner described, that is to say, the same information occurs during two successive field periods but is shifted over half a line period in time and shifted in the vertical direction over one line in case of display.

For generating the pseudo-interlaced picture signal shifted over half a line period during the line readings it is simplest to form the pick-up device PD with a pick-up panel P. The construction of the read means D does not pose any problem for performing the shifted line readings due to the three separately effected readings of the read strips $D_1$, $D_2$ and $D_3$. In the pick-up tube construction of the pick-up device PD with three electron beams scanning the read strips $D_1$, $D_2$ and $D_3$ it must be possible to deflect these beams independently of each other, which requires more complicated deflection means than for an equal deflection of the three beams.

When using a pick-up panel P in the camera according to FIG. 1 actually interlaced picture signals Y, R and B may alternatively be obtained in a simple manner. To this end the panel P is to be formed with a plurality of series of pick-up areas . $P_x$ which $P_x$ which is equal to the number of television lines constituted by a raster, i.e. two fields. The first and the last series of pick-up areas in the read strips $D_1$ and $D_3$, respectively, is half a series which begins and ends in the middle of the read strips $D_1$ and $D_3$, respectively. Two juxtaposed series of pick-up areas are always read simultaneously in the read strips $D_1$, $D_2$ and $D_3$ but only the information of one series of pick-up areas is utilized for application to the output $PD_1$, $PD_2$ or $PD_3$. The information of the other series is not utilized but is erased. Taking the succession of the shifted fields described in the table with the underlined and dot-provided signals B, R and Y into account, there follows that for each read strip $D_1$, $D_2$ and $D_3$ the first, third, fifth, etc. series provides, three times in succession, the useful information and subsequently, three times in succession, the second, fourth sixth etc. series. In this case the type of reading of the series in the read strips $D_1$, $D_2$ and $D_3$ alternates in the manner shown in the Table. In the cycle 2 at the change-over position $c$ for example the read strip $D_1$ produces the signal $\underline{B_1}$ for the odd series of pick-up areas, whereas the strips $\overline{D_2}$ and $D_3$ produce the signals $\underline{Y_2}$ and $\underline{R_3}$ for the even series of pick-up areas. The example considered in the foregoing is the conventional 2-in-1 interlacing for two fields constituting one raster; alternatively a more multiple interlacing is possible.

Figure 2:
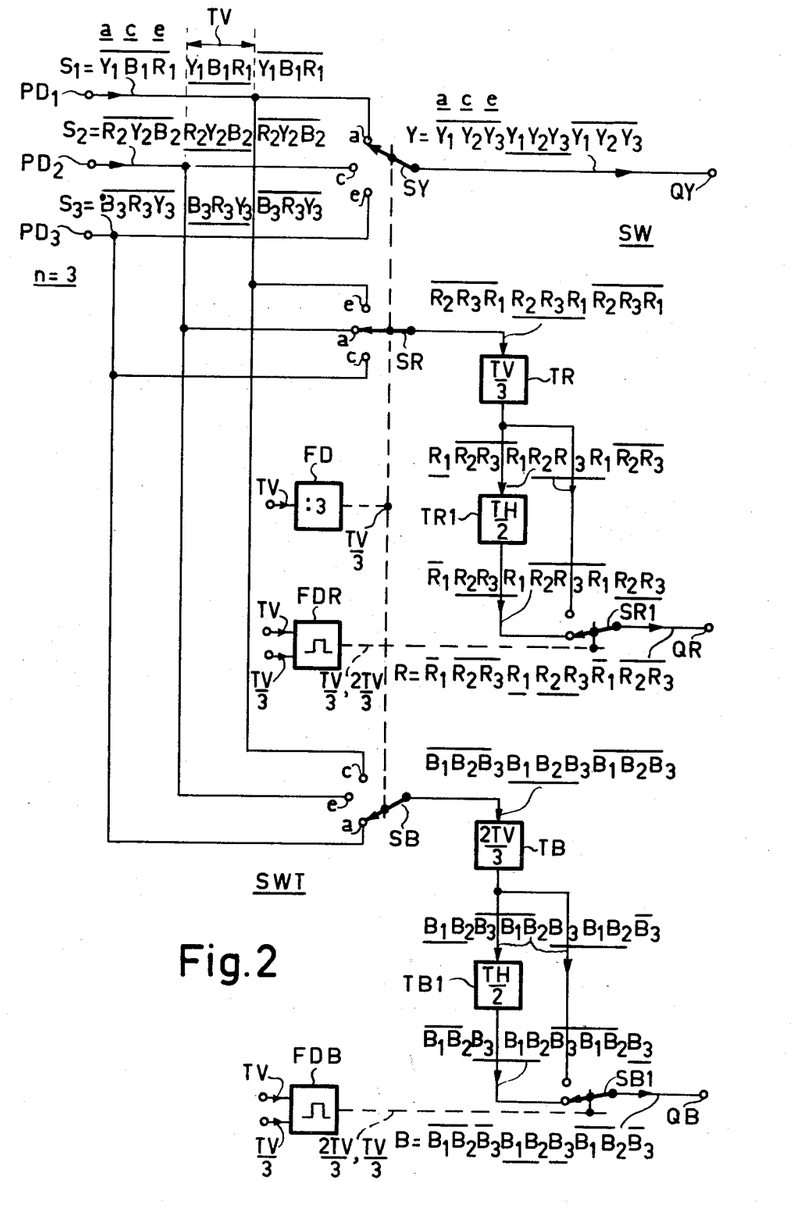
FIG. 2 shows a second embodiment of a sequential-simultaneous converter suitable for use in the camera according to FIG. 1, taking line interlacing into account.

For obtaining interlaced picture signals Y, R and B it has been described with reference to FIG. 1 that the simultaneous readings of the read strips $D_1$, $D_2$ and $D_3$ of the pick-up device PD are to be effected in an adapted manner, sometimes mutually different over half a line period. FIG. 2 shows an embodiment of the converter SWT in which the simultaneous readings of the pick-up device PD are not mutually different for the read strips $D_1$, $D_2$ and $D_3$. In FIG. 2 components of the camera of the same structure already described with reference to FIG. 1 have the same reference numerals, which also applies to the further Figures to be described. The output signals $S_1$, $S_2$ and $S_3$ with three cycles of the signals Y, B and R are shown at the outputs $PD_1$, $PD_2$ and $PD_3$ in which a line above and below the cycles of these signals denotes a, for example, odd and even line reading, respectively. It is found from the signals $S_1$, $S_2$ and $S_3$ of FIG. 2 that all three read strips $D_1$, $D_2$ and $D_3$ have an odd or even line reading. An interlaced picture signal $Y = \overline{Y_1Y_2Y_3}Y_1\underline{Y_2}Y_3\overline{Y_1Y_2Y_3}$ is obtained through the change-over switch SY. The actually interlaced generated picture signal Y may not only be generated in a simple manner in the embodiment of the pick-up panel but also in an embodiment of the pick-up tube. In the pick-up tube embodiment the three described electron beams scan the read strips $D_1$, $D_2$ and $D_3$ on the pick-up plate P in a simultaneously equal manner with two interlaced scanning rasters in two successive field periods TV. The diameter of the electron beam is then to be so large, that there is no information left between the two juxtaposed lines after two consecutive line scans in the odd or even line raster. In pick-up tubes such as electron beams scan is generally effected with the known result that the effective light integration time for the odd and even line rasters is equal to one field period and not to the theoretically possible raster period.

The change-over switch switch SR passes a signal $\overline{R_2R_3R_1}\underline{R_2R_3R_1}\overline{R_2R_3R_1}$ to delay circuit TR so that it produces a signal $\underline{R_1}\overline{R_2R_3R_1}\underline{R_2R_3R_1}\overline{R_2R_3}$. This signal occurs simultaneously with the picture signal Y of FIG. 2. A comparison shows that the signal $\underline{R_1}$ is erroneously interlaced with respect to the signal $\overline{Y_1}$ to be taken as a reference. The same applies to the signal $\overline{R_1}$ with respect to the signal $\underline{Y_1}$. By means of a delay circuit TR1 in FIG. 2 with a delay time of TH/2 a signal delayed over half a line period is derived from the said signal to that upon display the information of for example the lines two, four, six etc. is shifted to the lines one, three, five, etc, which yields a signal $\overline{R_1R_2R_3R_1}\underline{R_2R_3R_1}\overline{R_2R_3}$. The outputs of the delay circuits TR and TR1 are connected to selection contacts of a change-over switch SR1. The switching arm of the change-over switch SR1 is connected to the camera output QR. The change-over switch SR1 is operated by a switching signal generator FDR which under the supply of synchronizing signals produces a periodical change-over signal with a period TV and TV/3 so that during periods TV/3 and 2TV/3 the delay circuits TR1 and TR, respectively, are connected to the output QR. The change-over switch SR1 bridges the delay circuit TR1 during the period 2TV/3. The camera output QR thus conveys the picture signal $R = \overline{R_1R_2R_3R_1}\ \underline{R_2R_3R_1}\overline{R_2R_3}$.

In the picture signal R the signals $\overline{R_2R_3}$ and $\underline{R_2R_3}$ which are directly provided by the delay circuit TR occur with exactly the same interlacing as the signals $\overline{Y_2Y_3}$ and $\underline{Y_2Y_3}$ in the picture signal Y. This does not apply to the signals $\overline{R_1}$ and $\underline{R_1}$ with respect to the signals $\overline{Y_1}$ and $\underline{Y_1}$ since as described the information on a line upon display is shifted over one line in the vertical direction, for example, the information of a third, fifth line is displayed at the area of a second, fourth line. The pseudo-interlacing upon display of the signal $R_1$ occurring in the frequency-limited picture signal R is by all means acceptable in the displayed picture; it is important that the interlacing in the picture signal Y is effected in the correct manner with a large bandwidth and hence a great definition upon display.

Furthermore FIG. 2 includes the change-over switch SB followed by the delay circuit TB with a delay time $2T^V/3$. The output of the delay circuit TB is connected directly and through a delay circuit TB1 with a delay time of half a line period (TH/2) to a respective selection contact of a change-over switch SB1. The master contact of the change-over switch SB1 is connected to the camera output QB. The change-over switch SB1 active as a shunt for the delay circuit TB1 is controlled by a switching signal generator FDB which under the supply of synchronizing signals with a period TV and TV/3 produces a periodical change-over signal so that during a time of 2TV/3 and TV/3 the delay circuits TB1 and TB, respectively, are connected to the output QB. The ouput QB thus conveys a picture signal $B = \overline{B_1B_2}\ \overline{B_3\underline{B_1B_2}}\ \underline{B_3B_1B_2B_3}$. The signals $\overline{B_3}$ and $\underline{B_3}$ are directly supplied by the delay circuit TB so that a correct interlacing is present upon display. The signals $\overline{B_1B_2}$ and $\underline{B_1B_2}$ which are obtained through the delay circuit TB1 have the pseudo-interlacing upon display. As described with reference to the picture signal R this is admitted. In this case it is favourable that the pseudo-interlacing upon display occurs over one third ($R_1$) of the display screen in the picture signal R and over the remaining two thirds ($B_2B_3$) in the picture signal B. In fact, the contribution of the red picture signal component (R) is greater upon display than that of the blue picture signal component (B) starting from the relation applying upon display and being determined by the acuity of the eye, i.e. $Y = 0.59 G + 0.30 R + 0.11 B$.

Figure 3:
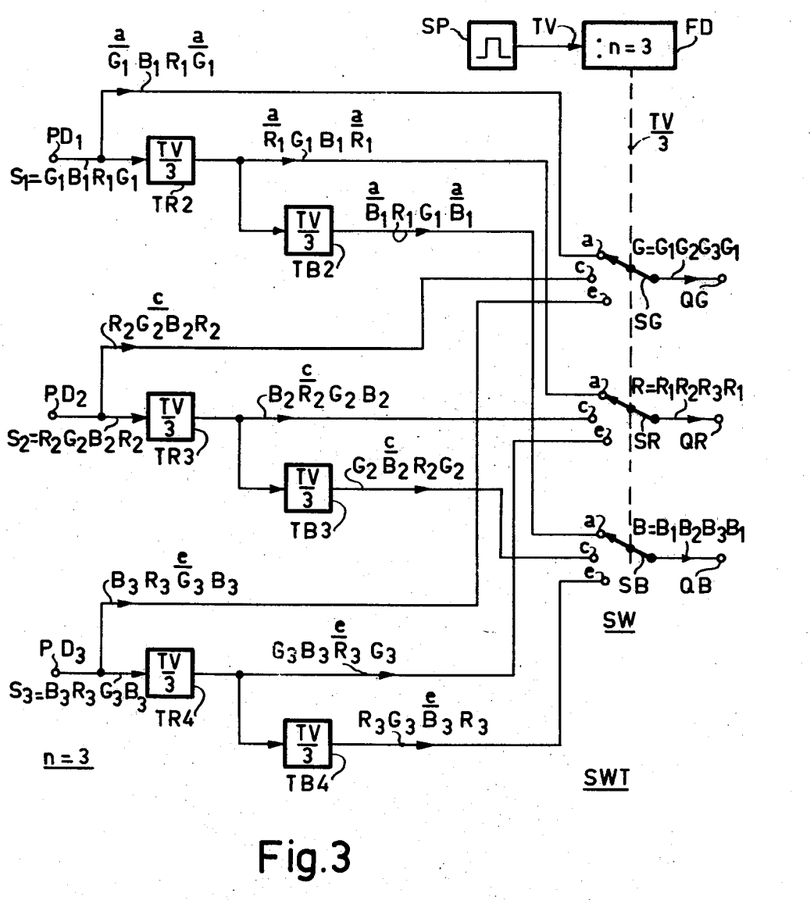
FIG. 3 shows a third embodiment of the converter.

FIG. 3 shows a third embodiment of a sequential-simultaneous converter SWT which may be used in the camera of FIG. 1. Some reference numerals used in FIG. 1 are repeated for FIG. 3. Instead of the luminance signal Y the green colour signal G occurs. To this end the completely transparent strips Y in the colour filter CF of FIG. 1 are to be replaced by strips G passing only green coloured light coming from the scene SC. As a result the signals $S_1 = G_1B_1R_1G_1$, $S_2 = R_2G_2B_2R_2$ and $S_3 = B_3R_3G_3B_3$ occur at the outputs $PD_1$, $PD_2$ and $PD_3$ of the pick-up device of FIG. 3. Delay circuits TR2 and TR3 and TR4 with a delay time of TV/3 are connected to the outputs $PD_1$, $PD_2$ and $PD_3$, respectively, so that the outputs thereof convey the signals $R_1G_1B_1R_1$, $B_2 R_2G_2B_2$ and $G_3B_3R_3G_3$, respectively. The delay circuits TR2, Tr3 and TR4 are followed by delay circuits TB2, TB3 and TB4, respectively, with a delay time of TV/3 so that the signals $B_1R_1G_1B_1$, $G_2B_2R_2G_2$ and $R_3G_3B_3R_3$ occur at their outputs.

The selection contacts $a$, $c$ and $e$ of the change-over switch SG are connected to the outputs $PD_1$, $PD_2$ and $PD_3$ of the pick-up device so that under the control of the switching signal generator FD the switch SG passes the picture signal $G = G_1G_2G_3G_1$ to the output QG. The selection contacts $a$, $c$ and $e$ of the change-over switch SR are connected to the outputs of the delay circuits TR2, TR3 and TR4, so that the picture signal $R = R_1R_2R_3R_1$ occurs at the output QR. The selection contacts $a$, $c$ and $e$ of the change-over switch SB are connected to the delay circuits TB2, TB3 and TB4 which produces the picture signal $B = B_1B_2B_3B_1$ and the output QB. As compared with the embodiment of the converter SWT according to FIG. 1 in which a joint delay time of three times TV/3 occurs, the embodiment according to FIG. 3 requires a total of a twice longer delay time. Furthermore the said advantages for the picture signals Y, R and B of FIG. 1 also apply in an equal manner to the picture signal G, R and B of FIG. 3.

Figure 4:
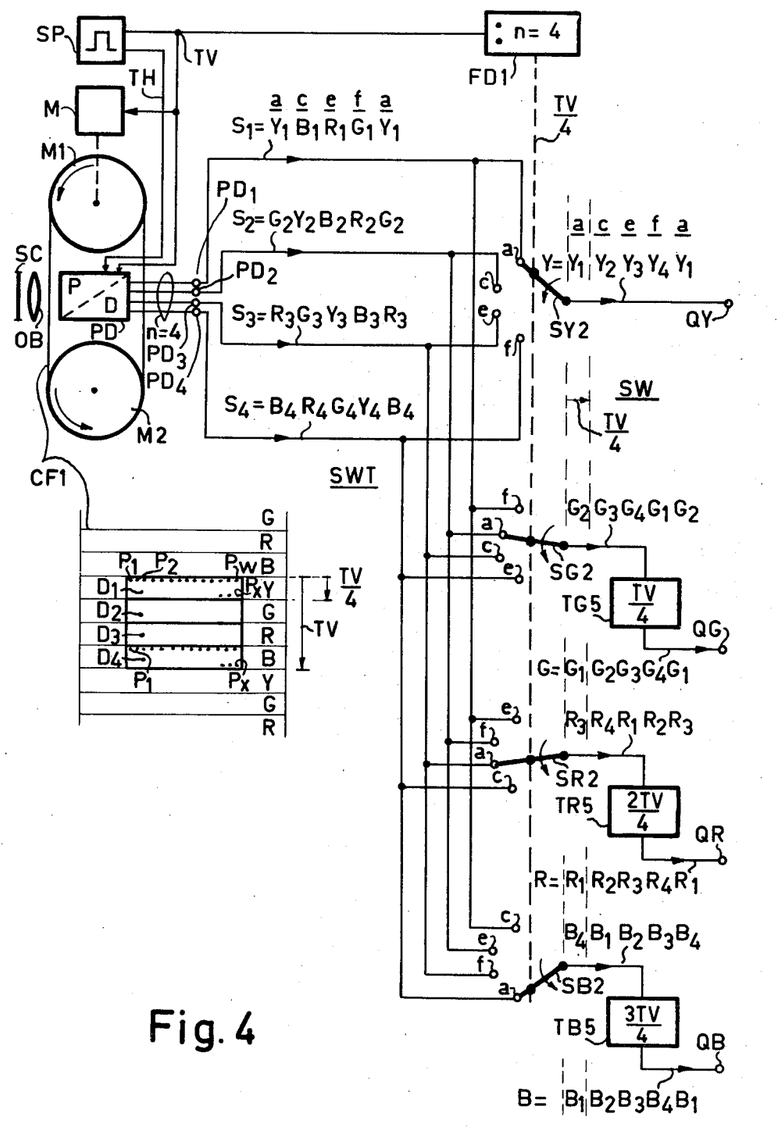
FIG. 4 shows a second embodiment of a colour television camera according to the invention and FIG. 5 shows a third embodiment.

FIG. 4 shows an embodiment of a colour television camera according to the invention in which a colour filter SF1 is used with groups of four filter strips Y, G, R and B. The repetition period of a group of strips remains equal to one field period TV according to the television standard so that per filter strip a displacement duration along a read strip (D) of TV/4 follows. The colour filter CF1 is formed as a tape which rotates along and in front of the pick-up device PD with the aid of two drums M1 and M2. The motor M drives the drum M1. When choosing groups with $n = 4$ filter strips, four corresponding read strips $D_1$, $D_2$, $D_3$ and $D_4$ occur at the pick-up device PD which are each provided with a pick-up output $PD_1$, $PD_2$, $PD_3$ and $PD_4$. The sequential-simultaneous converter SWT has four change-over switches SY2, SG2, SR2, SB2 each having four selection contacts $a$, $c$, $e$ and $f$. The selection contacts $a$, $c$, $e$ and $f$ are connected in a similar manner to the outputs $PD_1PD_2PD_3$ and $PD_4$ of the pick-up device as described in FIG. 1. The change-over switches SG2, SR2 and SB2 are followed by the delay circuits TG5, TR5 and TB5, respectively, having a delay time of TV/4, 2TV/4 and 3TV/4, respectively. The change-over switches (SW) are driven by a switching signal generator FD1 which is formed as a four-to-one divider for supplying a change-over signal having a repetition period of TV/4. Simultaneously occurring picture signals $Y (= Y_1, Y_2, Y_3, Y_4, Y_1 ... )$ G, R and B occur at the camera outputs QY, QG, QR and QB in accordance with the manner described with reference to FIG. 1. The advantages described with reference to FIG. 1 are maintained in the same manner in the embodiment of FIG. 4 in which the shorter displacement duration (TV/4) or the filter strips over the read strips is more favourable for preventing discoloured edges. The picture signals Y, R, G and B are processed in known manner as is common practice when using 4-pick-up tube cameras with all attendant advantages.

In the manner as described with reference to FIG. 2 based on the camera according to FIG. 1, interlacing may also be obtained in the camera according to FIG. 4. To this end delay circuits TG1', TR1' and TB1' and bridging change-over switches SG1', SR1' and SB1' are to be provided between the delay circuits TG5, TR5 and TB5 and the camera outputs QG, QR and QB, respectively. While using the line-notation shown in FIG. 2 it simply follows that for a picture signal $Y = Y_1Y_2Y_3Y_4\underline{Y_1Y_2Y_3Y_4}$ the following (colour) picture signals are obtained at the camera outputs Q: $G = G_1G_2G_3G_4\underline{G_1G_2G_3G_4}$, $R = \overline{R_1R_2R_3R_4}\underline{R_1R_2R_3R_4}$ and $B = \overline{\overline{B_1B_2B_3B_4}}\underline{B_1B_2B_3B_4}$. In this case the signals $G_2G_3G_4$, $R_3$ $R_4$ and $B_4$ are directly derived from the delay circuit TG5, TR5 and TB5. For the purpose of changing over which is required for interlacing the camera according to FIG. 4 is to be provided with three switching signal generators FDG', FDR' and FDB' supplying periodical change-over signals so that each field period TV a respective change-over is effected at ¼, 2/4 and ¾ part of the field period TV. Generally there applies a change-over at 1/n part with n being equal to the number of read strips.

Figure 5:
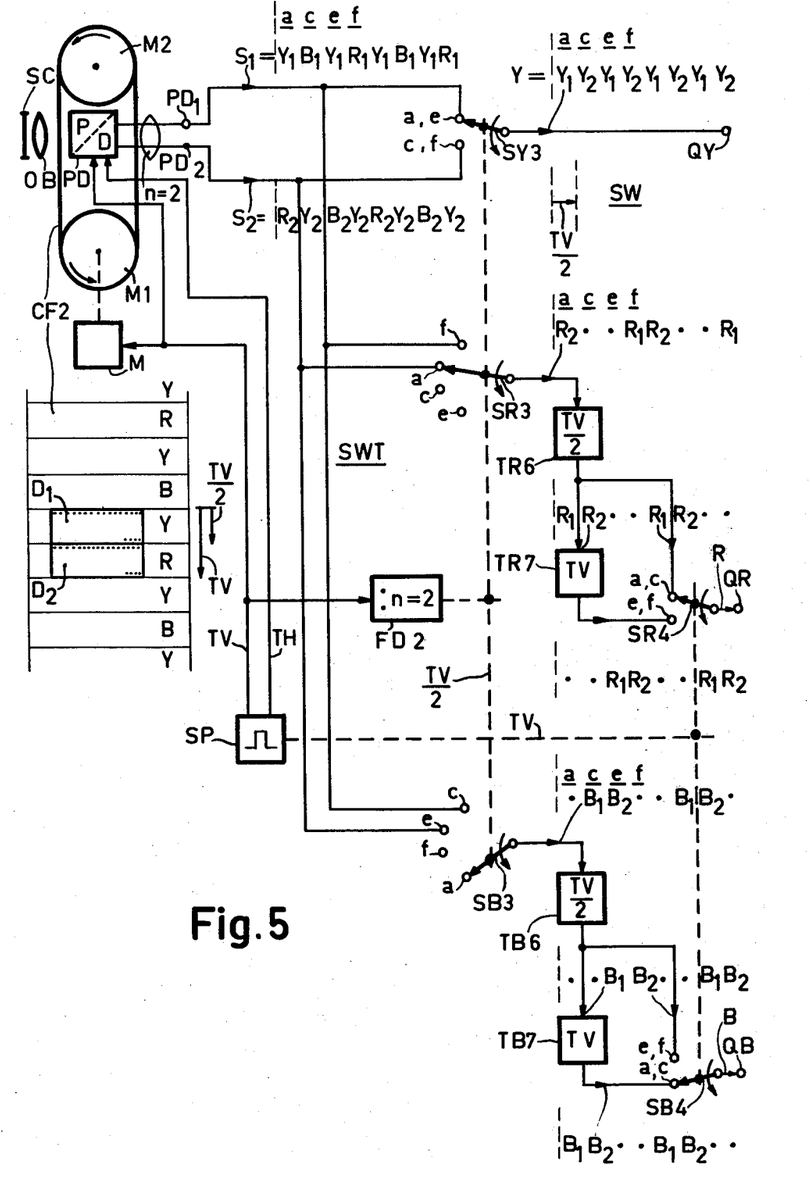

FIG. 5 shows an embodiment of a colour television camera according to the invention in which the pick-up device is formed with only $n = 2$ read strips $D_1$ and $D_2$ along and in front of which a colour filter CF2 formed as a tape is rotated with the aid of the motor M and the drums M1 and M2. The colour filter CF2 is provided with filter strips Y, R, Y, B, Y, R, etc. During the field period TV two filter strips rotate completely along and in front of the read strips $D_1$ and $D_2$ so that per filter strip the displacement duration of TV/2 follows. The pick-up device PD is provided with two outputs $PD_1$ and $PD_2$ coupled to the read strips $D_1$ and $D_2$. The pick-up outputs $PD_1$ and $PD_2$ are connected to two selection contacts of a change-over switch SY3 whose master contact is connected to the output QY. Likewise the outputs $PD_1$ and $PD_2$ of the pick-up device are connected to two selection contacts of change-over switches SR3 and SB3, respectively, the other two selection contacts of which are free. The change-over switches SY3, SR3 and SB3 are controlled from a switching signal generator FD2 which is formed as a two-to-one divider and is connected to the synchronizing signal generator SP for the supply of a synchronizing signal with the repetition signal TV. The generator FD2 provides a change-over signal having a repetition period TV/2 so that during this period the switching arm of the change-over switches SY3, SR3 and SB3 is connected to one of the selection contacts. The references $a$, $c$, $e$ and $f$ denote corresponding selection contacts. Likewise as in the foregoing occurs some signals $S_1$ and $S_2$ are shown as the outputs of the pick-up device in which the references $a$, $c$, $e$ and $f$ denote the successive positions of the change-over switches SY3, SR3 and SB3. There applies that $S_1 = Y_1B_1Y_1R_1Y_1B_1Y_1R_1$ and $S_2 = R_2Y_2B_2Y_2R_2Y_2B_2Y_2$ in which the positions $a$, $c$, $e$ and $f$ are associated with the signals $Y_1B_1Y_1R_1$ (etc.) and the signals $R_2Y_2B_2Y_2$(etc.). In the signals shown in FIG. 5 a solid line denotes the instant which corresponds to the shown position of the colour filter CF2. In the positions $a$ and $e$ the switching arm of the change-over switch SY3 is connected to the output $PD_1$ of the pick-up device and in the positions $c$ and $f$ it is connected to the output $PD_2$. As a result a picture signal $Y = Y_1Y_2Y_1Y_2Y_1Y_2Y_1Y_2$ occurs at the camera output QY.

Only the selection contacts $a$ and $f$ of the change-over switch SR3 are connected to the respective outputs $PD_2$ and $PD_1$ of the pick-up device so that the change-over switch SR3 passes a signal $R_2 .. R_1R_2 .. R_1$ in which the dotted notation means that the switching arm is connected to a free contact $c$ or $e$. Similarly the contacts $e$ and $c$ of the change-over switch SB3 are connected to the outputs $PD_1$ and $PD_2$ of the pick-up device which yields a signal $(.B_1B_2..B_1B_2.)$.

The change-over switch SR3 is connected to a delay circuit TR6 having a delay time of TV/2 and is subsequently directly connected to a selection contact of a change-over switch SR4 and through a delay circuit TR7 having a delay time of TV to the second selection contact thereof. The master contact of the change-over switch SR4 is connected to the camera output QR. Likewise the change-over switch SB3 is connected through delay circuits TB7 and a change-over swtich SB4 to the camera output QB. Under the control of the signal generator SP providing a periodic change-over signal having the field period TV the switching arm of the change-over switches SR4 and SB4 is connected during a field period TV to one of the two selection contacts denoted by $a$, $c$ and $e$, $f$. Starting from the change-over switch position $a$ shown in FIG. 5 the change-over switch SR4 constitutes a combination from the signals $R_1R_2..R_1R..$ and $..R_1R_2..RR_2$ yielding the picture signal $R(=R_1R_2R_1R_2R_1R_2R_1R_2)$. Likewise the change-over switch SB4 constitutes a combination from the signals $..B_1B_2 ..B_1B_2$ and $B_1B_2..B_1B_2..$ which yields the picture signal $B(=B_1B_2B_1B_2B_1B_2B_1B_2)$. Since the bridging switches SR4 and SB4 determine the correct choice of the signals passed to the camera outputs QR and QB the change-over switches SR3 and SB3 instead of being formed with two free contacts may likewise be formed with only the two connected contacts. In fact, in case of connection to the contact $a$, $c$ of the change-over switches SR4 and SB4 it does not matter which signal occurs at the contact $e$, $f$.

In a pick-up tube embodiment of the pick-up device PD according to FIG. 5 formed with only two read strips $D_1$ and $D_2$ which are constituted by a pick-up plate P divided in two, the said electron beam deflection may simply be used in which each of the two electron beams successively scans the two read strips $D_1$ and $D_2$, one beam being present on the strip $D_1$ and the other being present on the strip $D_2$.

In a similar manner as described in FIG. 5 it is possible to realize a camera having four outputs (Q) when using $n = 3$ read strips (D). Instead of the sequence of the filter strips YBYRYBYR with the displacement duration of TV/2 shown in FIG. 5 a suitable colour filter therefor might have the sequence YBGYRGYBGYRG having a displacement duration of TV/3. It can be easily seen with reference to FIG. 5 that the three outputs $PD_1'$, $PD_2'$ and $PD_3'$ of the pick-up device are followed by some changeover switches SY3', SG3', SR3' and SB3' each having three connected selection contacts. Subsequently there are the delay circuits: TG6' having a delay time of TV/3, TR6' and TB6' having a delay time of 2TV/3, TR7' and TB7' having a delay time of TV. Furthermore there are bridging switches SR4' and SB4'.

The camera according to FIG. 5 with $n = 2$ and the above described embodiment with $n = 3$ makes it possible to generate interlaced picture signals by providing the modifications described with reference to FIG. 2, which modifications are based on the camera according to FIG. 1. Since all this can be simply realized the further embodiment is not given.

In FIGS. 1, 4 and 5 the read strips ($D_1$, $D_2$, $D_3$, $D_4$) of the pick-up device PD are shown immediately one beside the other. This is not required. By using, for example, an optical glass fibre system the light split through the colour filter CF and coming from the scene SC may be passed to spaced read strips. In the pick-up panel embodiment of the pick-up device PD the interspace may be utilized for example, for components of the read means D or delay means TR, TB, TG to be incorporated in the semiconductor body. In a pick-up tube embodiment, no information is lost which occurs at the area of the cuts between the read strips (D) in the pick-up plate P.

The colour filter Cf is shown in a mechanical construction in FIGS. 1, 4 and 5. An electronic embodiment may be considered in which for example, a liquid colour filter is provided in front of the pick-up device PD, while the local light pass characteristic of said liquid is adjustable as a function of an electrical voltage applied thereacross. It might be achieved by means of a voltage variation that the strips having a giving light pass characteristic are displaced in the liquid colour filter which for the operation corresponds to the tape construction of the colour filter CF of FIGS. 4 and 5.

What is claimed is:

1. A color television camera comprising a color filter including a plurality of movable strip means having different chromatic transmission characteristics for separating incident light into different colors; a pickup device disposed behind said color filter having a plurality of read strips, a read means for simultaneously reading said read strips, and a plurality of output means for providing sequential output signal of successively different colors corresponding to said filter strips; switching and delay circuit converter means coupled to said pickup device outputs and having output means for providing simultaneous signals of different colors corresponding to the same read strip at any one instant of time; and a plurality of camera outputs coupled to said converter outputs respectively.

2. A color television camera as claimed in claim 1, characterized in that said switching circuit is provided with at least the same number of change-over switches as there are read strips, said change-over switches being provided with at least said same number of selection contacts and a master contact, said selection contacts being connected to the outputs of the pick-up device and said master contact being connected to an output of the camera, said change-over switches providing a different connection to the outputs of the pickup device and being connected for the purpose of synchronous switching to switching signal generator for supplying a change-over signal between two successive readings of the read strips.

3. A color television camera as claimed in claim 1, characterized in that the switching circuit is active in a line blanking period according to a television standard and switching is effected as many times as there are read strips in a field period according to the television standard.

4. A color television camera as claimed in claim 1, characterized in that one of the camera outputs is coupled to the outputs of the pick-up device through a change-over switch connected thereto and bypassing the said delay circuit.

5. A color television camera as claimed in claim 2, characterized in that the master contacts of the said change-over switches, save for one, are connected through the delay circuits to the associated camera outputs.

6. A color television camera as claimed in claim 5, characterized in that the delay times of the delay circuits connected to the change-over switches are different and are equal to or are successive integral multiples of the time in which the read strips are read.

7. A color television camera as claimed in claim 2, characterized in that the number of read strips at the pick-up device is smaller than the number of camera outputs and the same number of change-over switches with selection contacts having the said smaller number, which contacts are connected to the outputs of the pick-up device, while master contacts of said change-over switches which are connected to the camera outputs through delay circuits, are connected to the camera outputs through a delay circuit having one and the same delay time in series with a further delay circuit having a delay time of a field period according to a television standard and with a further change-over switch for bridging the further delay circuit to the camera output, said further change-over switch being connected for the purpose of control to a further signal generator for providing a periodic change-over signal causing a change-over at the beginning of a field period.

8. A color television camera as claimed in claim 2, characterized in that the read means serve for performing an interlaced instantaneously identical line reading of the read strips in successive field periods according to a television standard, and that a further delay circuit having a delay time equal to part of the line period according to the television standard and a further change-over switch for bridging the further delay circuit to the camera output are provided near each of said change-over switches with the associated delay circuit, said further change-over switch being connected for the purpose of control to a further switching signal generator providing a periodic change-over signal so that in each field period a change-over is effected in a part of it which is the reverse of the number of read strips.

9. A color television camera as claimed in claim 1, characterized in that the pick-up device which is formed with a pick-up panel having photosensitive pick-up areas in a semiconductor body is built up from the said number of separate read strips each being coupled to one of the outputs of the pick-up device, each read strip comprising a plurality of a series of pick-up areas to be read, said series of pick-up series areas being connectable through the read means successively to the output of the pick-up device associated with the read strip.

10. A color television camera as claimed in claim 9, characterized in that the simultaneously occurring readings of the read strips in the pick-up panel performed by the read means are effected according to a television standard with the aid of a mutual shift of half a line period alternately occurring between the read strips.

11. A color television camera as claimed in claim 1, characterized in that the pick-up device which is formed with a pick-up tube provided with a pick-up plate having a potential image which can be obtained through a photosensitive conversion and which corresponds to the scene to be picked up has a pick-up plate which comprises said number of separate read strips each being coupled to one of the outputs of the pick-up device while the read means are formed with at least an electron gun for supplying the number of electron beams simultaneously scanning the read strips.

* * * * *